Jan. 26, 1965   R. A. CHURCH ETAL   3,167,253
CONTROL ARRANGEMENT FOR AIR DISTRIBUTING UNITS
Filed July 27, 1961   2 Sheets-Sheet 1

INVENTORS
RICHARD A. CHURCH
BORIS W. HARITONOFF
BY
Seymour Rothstein
ATTORNEY.

Jan. 26, 1965   R. A. CHURCH ETAL   3,167,253
CONTROL ARRANGEMENT FOR AIR DISTRIBUTING UNITS
Filed July 27, 1961   2 Sheets-Sheet 2

*INVENTORS*
RICHARD A. CHURCH
BORIS W. HARITONOFF
BY Seymour Rothstein
ATTORNEY.

United States Patent Office 3,167,253
Patented Jan. 26, 1965

3,167,253
CONTROL ARRANGEMENT FOR AIR
DISTRIBUTING UNITS
Richard A. Church, North Syracuse, and Boris W. Haritonoff, Kirkville, N.Y., assignors to Carrier Corporation, Syracuse, N.Y., a corporation of Delaware
Filed July 27, 1961, Ser. No. 127,243
12 Claims. (Cl. 236—80)

This invention relates to air distributing units and, more particularly, to an air distributing unit incorporating a variable volume damper and an improved control therefor.

In copending application Serial No. 824,053, filed June 30, 1959, now Patent No. 3,082,676, granted March 26, 1963, in the names of Richard A. Church, Joseph Blanchette and James H. Paris, entitled "Air Distributing Unit," there is disclosed an air conditioning system including an air distributing unit for the interior zones of buildings. As stated therein, these interior zones have heretofore been considered as constant load areas. In reality, minor changes in load occur, frequently resulting in inadequate air conditioning of such zones.

The present invention is concerned with a unit of the type described in the copending application above referred to which incorporates improved control means to utilize plenum chamber pressure or other suitable pressure sources such as conduit pressure to actuate the control means to maintain a substantially constant volumetric discharge from the air distributing unit. The control means is sensitive to minor changes in plenum chamber pressure or other pressure and is useful over a large load range. Unique adjustment means are provided for the control means. The invention also involves the use in the control means of temperature-responsive means for varying the volumetric discharge from the outlet of the unit in response to variation in temperature within the area to be treated. It will be appreciated that in use the control means is set to provide a substantially constant maximum quantity of air discharged from the unit and that the temperature-responsive means serves to reduce the quantity of air discharged from the unit in response to temperature conditions within the area being treated.

An object of the present invention is to provide an air distributing unit including damper means and controls therefor to regulate air discharge in accordance with a wide range of load conditions in an area to be treated.

Another object of the invention is to provide an air distributing unit including damper means which may be actuated in response to pressure of the fluid being supplied to the unit and control means for maintaining the volumetric discharge from the unit substantially constant while compensating for changes in pressure of the fluid being supplied to the unit.

A further object is to provide an improved control for a bladder damper, such control including a regulator having a pair of variable orifice means therein.

A still further object is to provide an air distributing unit including a bladder damper which is actuated by the pressure of air being supplied to the unit and includes a control for maintaining the volumetric discharge from the unit substantially constant, such control comprising a regulator having a pair of variable orifice means therein and means for simultaneously adjusting the orifice means.

Yet another object of this invention is to provide an improved pressure-responsive valve for use in a control system for an air distributing unit.

Other objects of the invention will be more readily perceived from the following description.

This invention relates to an air distributing unit for discharging conditioned air into an area to be treated and comprises a plenum chamber, means for supplying air at a predetermined pressure to said plenum chamber, means defining an outlet from said plenum chamber into the area to be treated, a variable volume control chamber for regulating the quantity of conditioned air supplied to the area being treated through the outlet, and means for controlling the volume of the control chamber comprising a valve having two chambers therein, one chamber connected to the plenum chamber and the other chamber connected to the variable volume control chamber, primary orifice means disposed between the two valve chambers, means responsive to the temperature of the area to be treated for bleeding air from said other valve chamber, secondary orifice means disposed between the primary orifice means and the air bleeding means, and means for simultaneously adjusting the primary and secondary orifice means.

This invention further relates to a pressure-responsive valve for use in a control system for an air distributing unit comprising a control fluid chamber, the valve comprising a first chamber adapted to communicate with the control fluid chamber, a second chamber communicating with the first chamber and adapted to communicate with a source of supply air, first orifice means between the first chamber and the second chamber, means for communicating the first chamber to a control mechanism responsive to a predetermined temperature condition, second variable orifice means disposed between the first chamber and the communicating means, and means for simultaneously adjusting the first and second orifice means.

The attached drawing illustrates a preferred embodiment of the invention in which.

Figure 1:
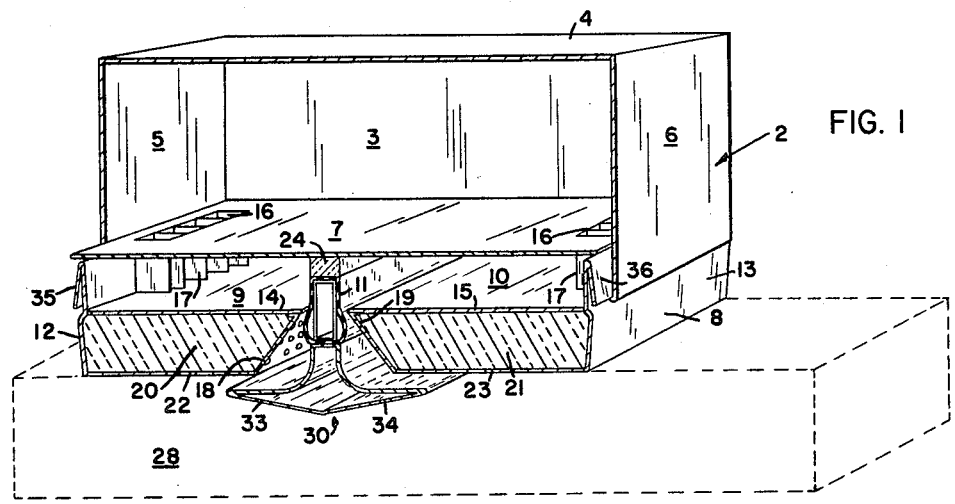
FIGURE 1 is a perspective view, partly in section, illustrating the air distributing unit.

Referring to the drawings, FIGURE 1 discloses a perspective view, partly in section, of the air distributing units. This unit includes a conduit section 3 which is defined by the top wall 4 and the side walls 5 and 6. The conduit section 3 has a lower wall 7 which separates the conduit section from the air distributing section 8.

The air distributing section 8 comprises the plenum chambers 9 and 10 which are located on opposite sides of a bladder damper 11. The plenum chamber 9 is defined by the extension of wall 12, wall 7 and the lower wall 14. Similarly, the plenum chamber 10 is defined by the wall 7, the extension of the wall 13 and lower wall 15. In order to pass conditioned air from the conduit section 3 into the plenum chambers 9 and 10, suitable openings 16 are spaced adjacent the edges of the wall 7 proximate the junctures of the wall 7 with the walls 5 and 6. Associated with these openings 16 are a plurality of deflecting vanes 17 which extend into plenum chambers 9 and 10. These vanes perform a diffusing action and substantially remove the velocity components from the air in the conduit 3 and convert it substantially to static pressure within plenum chambers 9 and 10. It will be appreciated these vanes may be omitted, if desired.

The air is discharged from the plenum chambers 9 and 10 through the longitudinal openings defined by the edges 38 and 39 of the walls 14 and 15 and the opposite edges defined by the bladder damper 11. This bladder damper will be described more fully hereinafter.

As the air passes from each of the plenum chambers, the air is expanded adjacent the angular walls 18 and 19. These walls may be suitably perforated, placing the discharge side of the longitudinal outlets from the plenum chambers into communication with the silencing chambers 20 and 21. The chamber 20 is defined by the walls 12, 14, 22, and the perforated section 18. The second silencing chamber 21 is defined by the walls 13, 15, 23, and the perforated section 19. These chambers may be filled with suitable sound-absorbing material, such as glass wool.

The bladder damper 11 may be connected to the wall 7 by means of a suitable filler piece 24 to maintain separate plenum chambers 9 and 10. It will be appreciated, that the filler piece may be omitted, thus providing a single plenum chamber, if desired, for certain applications.

A suitable deflector 30 may be suspended from the lower portion of the bladder damper 11 to deflect the air discharged from the respective plenum chambers into area 28 in a general horizontal direction substantially parallel to the walls 22 and 23. These deflectors may consist of two surfaces 31 and 32 which perform a turning function and also provide two longitudinal slots. For the purpose of maintaining low noise levels, these surfaces 31 and 32 may be flocked. It will be obvious that the surfaces 31 and 32 might be recessed and that a suitable insulation, as for example, glass fibers might be placed in the recesses to similarly maintain low noise levels. The lower portion of the illustrated deflector comprises two angularly disposed planar surfaces 33 and 34.

Very often it is desired that these units be continuous throughout the length of an area. In other situations it may be desirable to separate these units. For this reason, the conduit section 3 is usually supplied in a three-sided construction with the open lower end being provided with bent sections (not shown). These bends extend toward the interior of the conduit and are intended to either fit closing members or to engage the bent portions of the air distributing sections 8, especially the walls 12 and 13 thereof which have outwardly bent portions 35 and 36 adapted to engage the conduit section 3.

Figure 2:
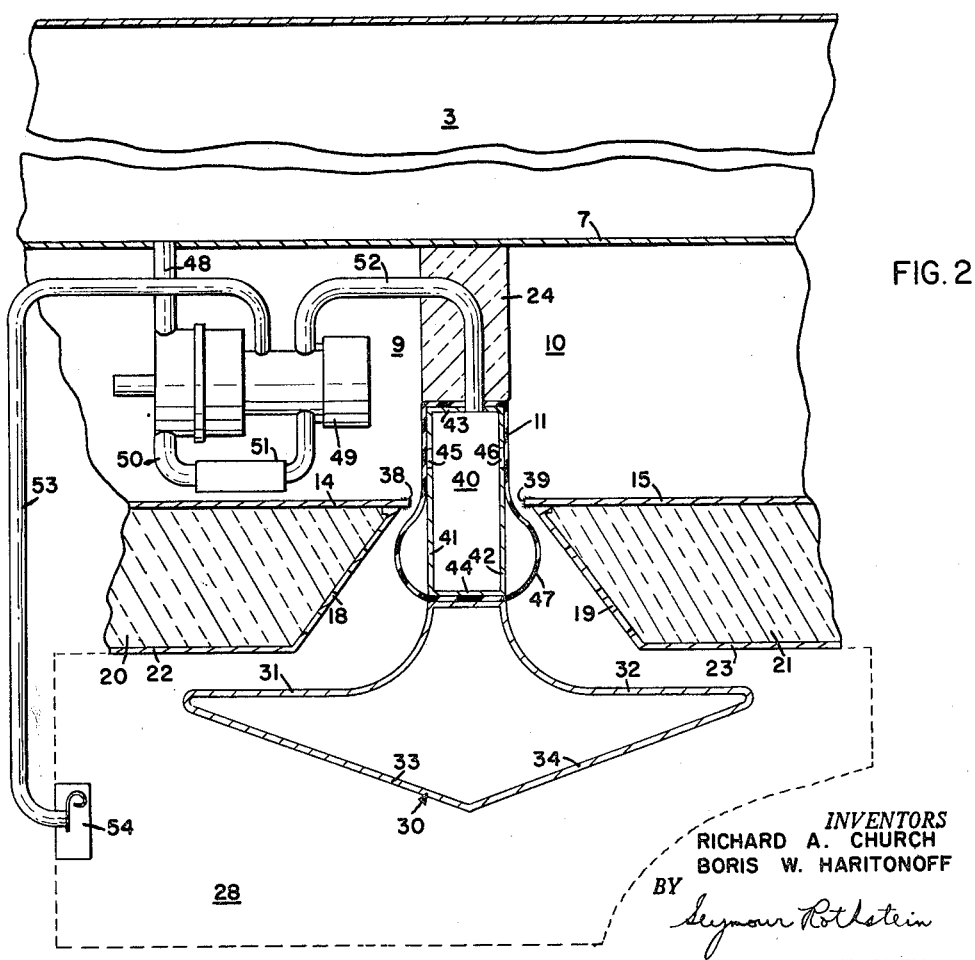
FIGURE 2 is an enlarged sectional view of the air distributing unit illustrating the bladder damper and the control therefor.

Referring to FIGURE 2, there is shown an enlarged view of the bladder damper with a control which may be utilized therewith. It will be noted that the walls 14 and 15 which define the lower portion of the plenum chamber extend beyond the juncture point with the walls 18 and 19. These edges form sealing edges 38 and 39 adapted to coact with the bladder damper to throttle the air passing from the plenum chambers. For the purpose of noise reduction, a suitable covering, as for example, felt or flock, is affixed to the edges 38 and 39. The bladder damper includes a chamber 40 which has a generally parallelepiped shape defined by the walls 41, 42, 43 and 44. Covering these walls which form the chamber 40 is a suitable fabric envelope 47 which comprises the bladder of the damper. The fabric may consist of a cloth impregnated with a suitable elastomer material, such as nylon fabric coated or impregnated with neoprene or a polymerized butadiene.

To actuate the bladder to cooperate with the edges 38 and 39 of the walls 14 and 15, suitable openings 45 and 46 are spaced in the walls 41 and 42. These openings are located in the upper portion of the chamber 40, specifically, in the portion of the bladder damper which extends into and at least partially defines wall portions of the plenum chambers 9 and 10. It is intended that a control pressure be introduced into the control chamber 40, this control pressure being normally a pressure less than the pressure existing within the conduit 3 and the plenum chambers 9 and 10. It is intended that the control fluid will pass through the openings 45 and 46 and be metered between the bladder 47 and the surfaces 41 and 42 adjacent the openings 45 and 46.

In physically providing the ports 45 and 46, it should be done in a manner so as not to provide positive sealing surfaces between the wall sections 41 and 42 which lie adjacent these ports, for it is intended that the fluid passing from the chamber 40 be able to pass toward the lower portion of the damper in such a manner as to permit restricted deflation and inflation of the lower portion of the damper in a manner to be described hereinafter.

The upper portion of the bladder will be maintained in substantial surface contact with the surfaces 41 and 42. However, as the air passes through the longitudinal openings defined by the edges 38 and 39 of the walls 14 and 15, and the bladder damper, the air will be expanded thereby decreasing its pressure. The lower portion of the bladder damper will be at a higher pressure than the adjacent air causing the lower portion of the bladder to inflate. This inflated bladder will cooperate with the edges 38 and 39 of the walls 14 and 15 to throttle the air passing from the plenum chambers 9 and 10.

It will be appreciated that because of the particular construction of the bladder and the inherent metering function performed by the bladder coacting with the area adjacent ports 45 and 46, air may be metered into the lower portion of the bladder providing stability in operation and avoiding the common defect of bladder dampers, namely, a fluttering action. This fluttering action which is normally experienced in bladder dampers contributes to poor control and also excessive noise resulting in making the damper inadequate for use.

Figure 3:
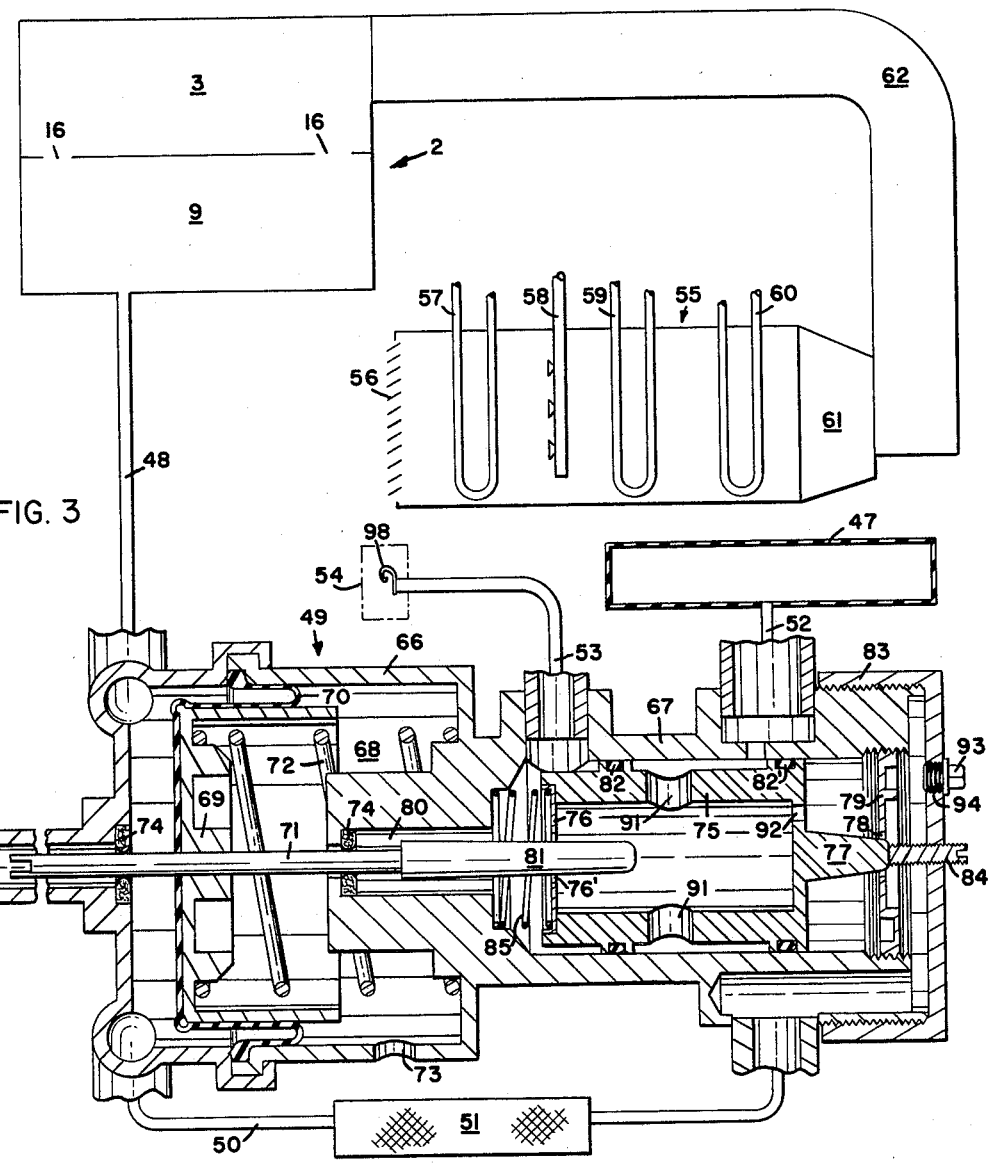
FIGURE 3 is a view, partly in section and partly diagrammatic, of the control system including the pressure-responsive valve of the control.

The control for the air distributing unit 2 is shown schematically in FIGURES 2 and 3. Line 48 extends from plenum chamber 9 and is connected to pressure-responsive valve 49. Line 50 interconnects the two chambers within valve 49. Disposed in line 50 is a filter 51 made from suitable material, for example, porous bronze. Line 52 connects valve 49 to the parallelepiped member which comprises the control fluid chamber of the bladder damper 11. A suitable thermostatic responsive element 54 controls the discharge of air from line 53 in response to the temperature within the area 28.

Referring to FIGURE 3, there is shown a diagrammatic view of the control for the damper shown in FIGURE 1, the pressure-responsive valve being shown in section.

Air is supplied to the unit 2 from a central station 55. This central station includes suitable louvered openings 56 for permitting air to enter the station, heat exchange means such as cooling coil 57, spray header 58, cooling coil 59 and heating coil 60. Air is induced into the central station through the louvered openings 56 by means of fan 61 which discharges into the conduit 62. From conduit 62, the air passes through conduit section 3 into the plenum chamber 9.

The pressure-responsive valve 49 comprises a housing which includes a power member 66 and a regulator member 67.

The walls of the cylindrical member 66 define a chamber 68. A portion of the chamber is in communication with the plenum chamber 9 through line 48. Reciprocatingly mounted in chamber 68 is piston 69. Diaphragm 70 is secured to the walls of power member 66 and to the spindle 71 to which the piston is connected. The pressure within the part of the chamber 68 in communication with line 48 will cause the piston to move to the right as viewed in FIGURE 3 against the spring 72 which biases the piston to the left. An opening 73 is provided in the wall of the power member 66 behind piston 69 and diaphragm 70 to allow smooth operation of the piston and diaphragm. Spindle 71 is supported for movement within the power member on bearings 74, which may be made from graphite.

Within the regulator member 67 are a pair of orifice means which function to regulate the pressure within the bladder 47 so as to accurately control the quantity of conditioned air discharged into the area 28. In the cylindrical chamber defined by the walls of the regulator member 67 there is movably mounted a cylindrical spool 75. An orifice plate 76 having an orifice 76' is secured in one end of the spool. A projection or needle 77 having a finely finished exterior surface extends from the other end of the spool. The needle 77 is tapered toward the end thereof and projects into orifice 78 in the orifice plate 79. Orifice plate 79 is adjustably secured in the regulator member 67. The needle 77 and orifice plate 79 may be considered to comprise a primary variable orifice means. The orifice means is manually adjustable, as later described.

The spindle 71 extends through a bore 80 in the valve 49. Secured to the end of spindle 71, preferably by a threaded connection, is a tapered needle 81 which extends into orifice 76' and which together with the orifice plate 76 comprise secondary variable orifice means. As will be set forth in more detail, the secondary orifice means is variable in response to plenum chamber pressure in the presently preferred embodiment of the invention.

Circumferentially disposed on the outer surface of the spool 75 are O-rings 82 and 82'.

Within the side walls of spool 75 are disposed one or more openings 91. An opening 92 in the face of spool 75 communicates the primary variable orifice 78 with the interior of spool 75. Air may pass from the interior of the spool through openings 91 into the annular chamber about the spool so defined between O-rings 82 and 82' and into line 52 to the bladder 47. The remainder of the air may pass through the orifice 76' through line 53 to the thermostatic responsive element 54. The thermostatic responsive element includes a bimetal 98 which is adapted to open and close the end of line 53 to permit bleeding of air from within regulator member 67 to the atmosphere in response to the temperature in the area being treated.

Figure 4:
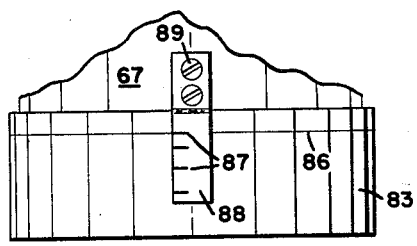
FIGURE 4 is a partial plan view of the pressure-responsive valve illustrating the indicator.

Valve cap 83 is threadedly secured on the end of regulator member 67. In the cap in alignment and in engagement with the needle 77 is a calibration screw 84. Spool 75 is biased into engagement with the calibration screw by spring 85. As seen in FIGURE 4, a circumferential groove 86 on the cap 83 cooperates with indicia 87 on the indicator 88 to indicate a predetermined quantity of air being discharged into the room from the air distributing unit. The indicator 88 is secured to the regulator member 67 by screws 89. It will be noted that rotation of the cap 83 with respect to the regulator permits simultaneous adjustment of the variable orifice means within the regulator member.

The orifice plate 76 and the tapered needle 81 are calibrated with respect to one another in the factory and need not be further adjusted in the field. The position of orifice plate 79 in the regulator member 67 may be factory calibrated in the following manner. Plug 93 in the cap member is removed. A pin member is inserted through the opening 94 into engagement with a recess in the face of the orifice plate 79. The calibration screw 84 is held fixed and the cap member 83 is then rotated to suitably position the orifice plate with respect to needle 77.

At the time of installation of the air conditioning unit and its associated controls in the field, it is intended that cap member 83 be rotated to align groove 86 with the desired indicia 87 on indicator 88 to suitably regulate bladder 47 so that the predetermined quantity of air is supplied to area 28. Calibration screw 84 bears upon needle 77 on spool 75 and repositions the two variable orifice means relative to one another. To increase the volume of air discharged from unit 2, the cap 83 is rotated away from regulator member 67. Spring 85 urges the spool 75 to the right as viewed in FIGURE 3 to reduce the opening in promary orifice 78. Simultaneously, the opening in orifice 76 is increased, for needle 81 tapers toward the right end thereof. Similarly, to decrease the volume of air discharged into area 28, the cap is turned inwardly toward the regulator member 67.

Considering the operation of the control described in FIGURE 3, air is introduced into the central station 55 through louvers 56. In the central station 55, the air may be selectively treated by any of the elements 57, 58, 59 and 60 to maintain the temperature and humidity of the air within desired limits. Air is discharged from the central station 55 by the fan 61 which discharges the conditioned air through the conduit 62 to conduit 3, the air passing through openings 16 into plenum chamber 9.

A portion of the air passes through line 48 into a portion of the chamber 68 defined within power member 66. The air passes through line 50 and filter 51 to the regulator member, which maintains the discharge through the outlet of the unit 2 substantially at a constant volumetric value.

Air passes through primary orifice 78 and through opening 92 in the face of spool 75 into the interior of the spool. A portion of this air then passes through opening 91 and line 52 into the bladder for control thereof. The remainder of the air passes through the secondary orifice 76' into line 53 to the thermostatic responsive element 54. When the thermostat 54 is satisfied, the bimetal 98 closes the open end of line 53. The pressure buildup within the regulator and chamber 40 causes the bladder to expand and reduce the quantity of air discharged into area 28.

When additional cooling is required, the bimetal 98 will open to permit some bleeding of the air to the atmosphere while at the same time permitting the bladder to be reduced in volume thus permitting a greater quantity of conditioned air to be discharged into area 28.

In normal operation, the control will respond to pressure changes in plenum chambers 9 and 10 so as to maintain a constant volumetric discharge through the outlet of the air distributing unit 2. The size of orifice 78 is manually adjusted to a predetermined setting. The amount of air passing through orifice 76' is varied with the change in area of the orifice as affected by the motion of needle 81 therein. As viewed in FIGURE 3, the needle is moved to the right in response to increased plenum chamber pressure within the power member and is moved to the left by spring 72 in response to decreased plenum chamber pressure.

By the above-described control system the pressure within the chamber 40, as shown in FIGURES 2 and 3, is varied in response to the changes in pressure in plenum chambers 9 and 10. This is achieved by the previously described action of bladder 47. The upper portion of the bladder which extends into the plenum chambers 9 and 10 is urged against the walls 41 and 42. As the air passes through the slots defined by the bladder damper 11 and the edges 38 and 39 of the walls 14 and 15 the air is expanded and the pressure in the lower portion of bladder 47 is at a level higher than the air being expanded. As a result the lower portion of the bladder 47 is expanded and cooperates with the edges 38 and 39 of the walls 14 and 15 to regulate the passage of air from the plenum chambers 9 and 10. In the event that the pressure within the plenum chambers decreases or increases, this change in pressure will be reflected in the new location of piston 69 and diaphragm 70 in valve 49 to move needle 81 to vary the size of orifice 76' in spool 75. This action controls the pressure existing within control fluid chamber 40 of bladder damper 11 and determines the amount of inflation occurring in bladder 47. Thus the amount of air passing through the outlet of the unit is determined in such manner as to maintain a constant volumetric discharge of air.

The present invention envisions a self-powered bladder damper control for units utilized to air condition the interior zones of buildings. The control is very accurate over a wide range of control pressures. Adjustment of the two variable orifice means within the pressure-responsive valve of the control is accomplished in one motion. Maintenance of the pressure-responsive valve is simplified for the valve cap can be removed to permit access to the orifice plate 79, spool 75 and needle 81. Because of these features the unit is more versatile than units heretofore employed and more satisfactory in operation because of its compensating features in response to load conditions within the area to be treated.

While we have described a preferred embodiment of the invention it will be understood that the invention is not limited thereto since it may be otherwise embodied within the scope of the attached claims.

We claim:

1. In combination with an air distributing unit for discharging conditioned air into an area to be treated including a plenum chamber, said plenum chamber being adapted to be placed in communication with the source of air at a desired pressure, means defining an outlet from said plenum chamber into an area to be treated, and a variable volume control chamber for regulating the quantity of conditioned air supplied to the area to be treated through the outlet, a control arrangement for controlling the volume of the control chamber including a valve having two chambers therein, one chamber connected to the plenum chamber and the other chamber connected to the variable volume control chamber, means forming a first orifice disposed between the two valve chambers, means for varying the effective area of the first orifice means adapted to be responsive to the temperature of an area to be treated for bleeding air from said other valve chamber, means forming a second orifice disposed between the primary orifice and the air bleeding means, means for varying the effective area of the second orifice, and means for simultaneously adjusting the separate orifice means.

2. An air distributing unit as in claim 1 wherein said means forming a first orifice comprises an orifice plate having an opening and said means for varying the effective area of the first orifice comprises a tapered member movable in said opening.

3. An air distributing unit as in claim 1 wherein said means for varying the effective area of the second orifice comprises a tapered member movable in said orifice to vary the size thereof.

4. An air distributing unit as in claim 1 wherein said valve includes a spool reciprocatingly mounted in said other valve chamber, said spool having the means forming the second orifice in one end thereof and the means for varying the area of the first orifice on the other end.

5. An air distributing unit as in claim 4 wherein the means for varying the area of the second orifice is movable in response to plenum pressure, said spool being constructed and arranged so that longitudinal movement thereof simultaneously adjusts the effective areas of the first and second orifices.

6. A pressure-responsive valve for use in a control system for an air distributing unit including a control fluid chamber, the valve comprising a first chamber adapted to communicate with said control fluid chamber, a second chamber communicating with said first chamber and adapted to communicate with a source of supply air, means between said first chamber and said second chamber forming a first orifice, means for varying the effective area of the first orifice, means adapted to connect said first chamber to a control mechanism responsive to a predetermined temperature condition, means disposed between the first chamber and the connecting means forming a second orifice, means for varying the effective area of the second orifice, and means for simultaneously adjusting the effective areas of the first and second orifices.

7. A pressure-responsive valve according to claim 6 including a spool in said first chamber, the means for varying the effective area of the first orifice comprising a needle secured to the spool, said adjusting means positioning said needle relative to said first orifice.

8. A pressure-responsive valve according to claim 6 including a spool in said first chamber, said means for forming a second orifice forming an opening in said spool, said means for varying the effective area of the second orifice comprising a tapered needle movable within the second orifice to vary the size thereof in response to a predetermined fluid pressure in the second chamber.

9. A pressure-responsive valve for use in a control system for an air distributing unit including a control fluid chamber, said valve comprising a housing having a chamber therein, the housing chamber having an outlet adapted to communicate with the control fluid chamber, means for connecting said housing chamber with a source of fluid pressure, means in said housing chamber forming a first orifice, means for regulating the size of the first orifice means, means in said housing chamber forming a second orifice adjacent the outlet, means for regulating the size of the second orifice in response to said fluid pressure, and means to actuate the regulating means for the first orifice and the second orifice to simultaneously adjust the effective sizes of the first and second orifices relative to one another.

10. A pressure-responsive valve according to claim 9 in which a spool is placed in said housing chamber, and said means for regulating the size of the first orifice comprises a needle secured to the spool, said adjusting means positioning said needle relative to said first orifice.

11. A pressure-responsive valve according to claim 9 in which a spool is placed in said housing chamber, the means forming the second orifice being placed in an end of said spool, said means for regulating the size of the second orifice comprising a tapered needle movable in the second orifice to vary the size thereof.

12. A pressure-responsive valve for use in a control system for an air distributing unit, said valve comprising a housing having a first chamber and a second chamber therein, means forming a first orifice in said first chamber, a first actuator movable within said first chamber to vary the effective area of the first orifice, means forming a second orifice within said first chamber, a second actuator responsive to a predetermined fluid pressure condition to vary the effective area of the second orifice, said housing having an inlet adjacent said first orifice adapted to communicate with said control system, said housing having a first outlet adjacent said second orifice adapted to communicate with a temperature responsive control mechanism, said housing having a second outlet adapted to communicate with a control fluid chamber in an air distributing unit, and means for simultaneously positioning the actuators relative to the orifices.

References Cited by the Examiner

UNITED STATES PATENTS

| | | | |
|---|---|---|---|
| 1,869,663 | 8/32 | Cartier | 236—12 |
| 2,264,261 | 11/41 | Erbguth | 263—82 |
| 2,517,081 | 8/50 | Caldwell | 236—82 |
| 2,608,985 | 9/52 | Arthur | 137—81 |
| 2,698,023 | 12/54 | Eckman | 236—82 XR |
| 2,793,812 | 5/57 | McDonald | 236—13 |
| 2,984,213 | 5/61 | Stiglic et al. | 137—82 XR |
| 3,058,664 | 10/62 | Donahue | 236—13 |

EDWARD J. MICHAEL, *Primary Examiner.*

ALDEN D. STEWART, *Examiner.*